Jan. 12, 1965  W. G. POTTER  3,165,625
HEATING-VENTILATING DEVICE
Filed March 28, 1961  5 Sheets-Sheet 1

INVENTOR.
William G. Potter
BY
*Michael Williams*
ATTORNEY

Jan. 12, 1965 W. G. POTTER 3,165,625
HEATING-VENTILATING DEVICE
Filed March 28, 1961 5 Sheets-Sheet 3

INVENTOR.
William G. Potter
BY
*Michael Williams*
ATTORNEY

United States Patent Office 3,165,625
Patented Jan. 12, 1965

3,165,625
HEATING-VENTILATING DEVICE
William G. Potter, Oakmont, Pa., assignor to
Edwin L. Wiegand Company, Pittsburgh, Pa.
Filed Mar. 28, 1961, Ser. No. 98,929
9 Claims. (Cl. 219—369)

The present invention relates to heating-ventilating devices and the principal object of the invention is to provide new and improved devices of the character described.

Devices of the present type, frequently known as unit ventilators, are widely used in classrooms and the like where close temperatures are to be maintained, where heating requirements vary considerably at different times, and where ventilating air from the outside must continually be introduced during room occupied periods to maintain a healthful atmosphere.

As a result of large window exposures of the modern classroom through which solar heat may enter, the large number of lights and the body heat given off by students in the relatively confined space, such rooms frequently require cooling, rather than heating, even during quite cold weather. This is usually accomplished by introducing sufficient quantities of outside air to the classroom to maintain its temperature at the desired level.

In the past, unit ventilators have utilized steam, hot water and electric heating elements as a source of heat and while these units are substantially the same regardless of the heat source, certain features of unit design and operation are found to be more critical with one heat source than with another. While unit ventilators of the type to be described are adapted to employ electric heating elements as a source of heat, it will readily be appreciated that other heat sources may also be utilized.

The present invention provides a unit ventilator which is highly efficient in maintaining a constant temperature, healthful room atmosphere. It is also highly efficient in its utilization of heat energy. It is relatively simple in design and is adapted for easy maintenance. These and other advantages will readily become apparent from a study of the following description and from the appended drawings.

In the drawings accompanying this specification and forming a part of this application, there is shown, for purpose of illustration, an embodiment which the invention may assume, and in these drawings.

Figure 1:
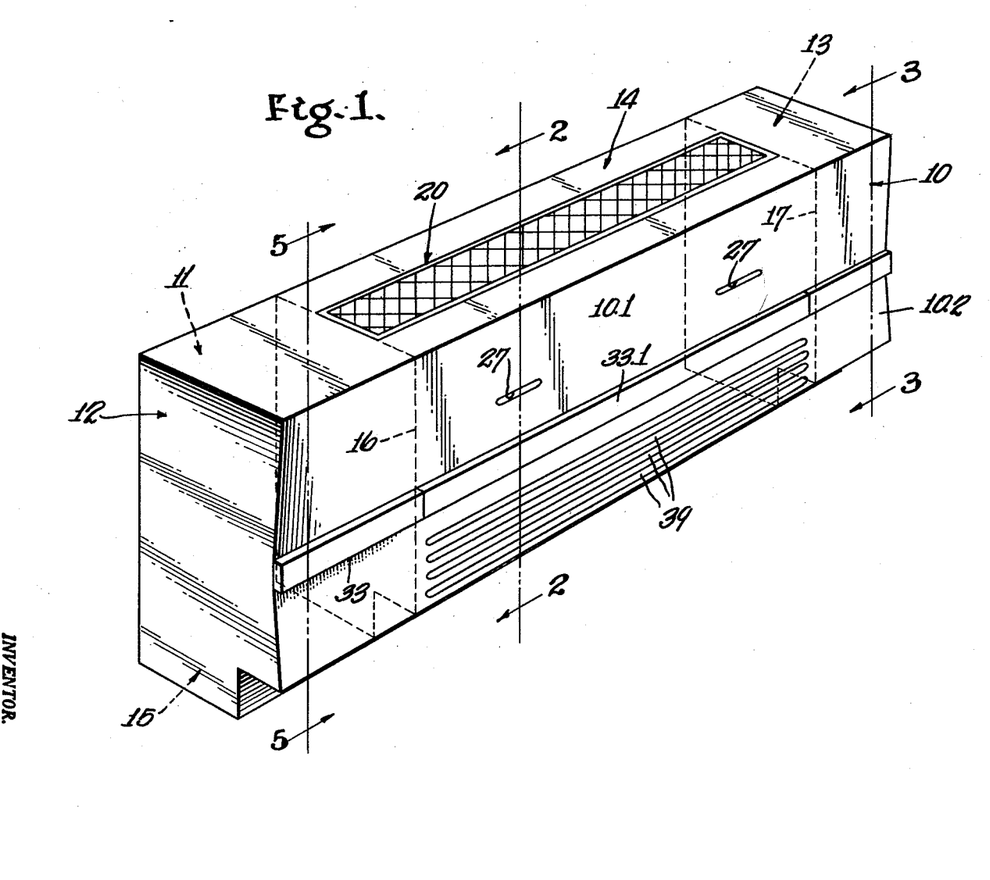
FIGURE 1 is a perspective view of a unit ventilator constructed in accordance with the present invention.

With reference to FIGURE 1, the present embodiment of the invention comprises an elongated, sheet-metal cabinet having a front wall 10, a rear wall 11, side walls 12 and 13, a top wall 14 and a bottom wall 15. This cabinet is preferably adapted to be positioned with its rear wall 11 against an outside wall of the room in which it is installed for a purpose to appear. Still referring to FIGURE 1, walls 16 and 17 are spaced longitudinally within the cabinet and divide its interior into a central cabinet portion flanked by right and left hand end cabinet portions.

Figure 2:
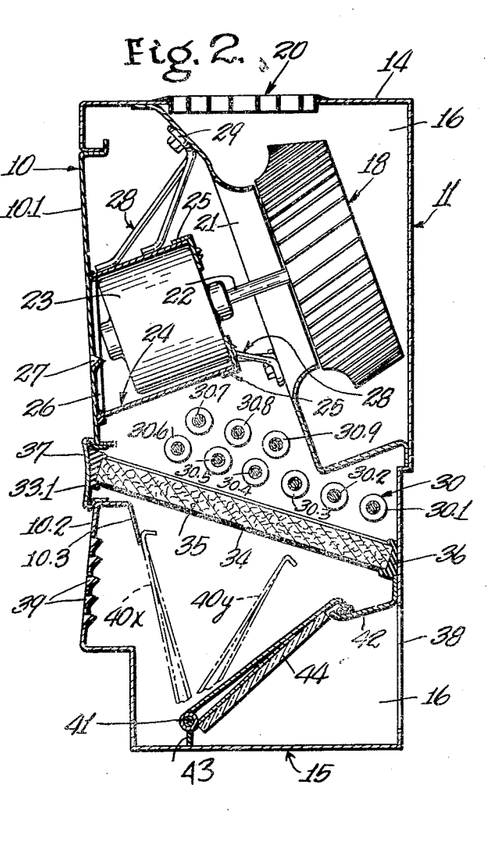
FIGURE 2 is an enlarged sectional view generally corresponding to the line 2—2 of FIGURE 1.

As best seen in FIGURE 2, the central cabinet portion is divided vertically into an upper blower section, a lower air intake-damper section, and an intermediate heater section. Considering first the upper blower section, the present embodiment employs two axial flow blowers 18 spaced longitudinally of the central cabinet portion. It is to be understood, however, that the use of two blowers is illustrative only and that a greater or lesser number could be employed. Each blower 18 is confined in a housing in part formed by the upper portion of the rear cabinet wall 11, and the rear portion of the top wall 14 of the cabinet, and respective angularly disposed interior walls 19 which may be integral with the cabinet or removably secured thereto in order to facilitate assembly and maintenance. The top wall of the intermediate cabinet portion is provided with an air outlet opening in which a suitable grill 20 is positioned and each angularly disposed interior wall 19 is provided with a circular, air inlet opening 21.

Each blower 18 is secured to the rotor shaft 22 of respective blower motors 23 which are angularly disposed on the air inlet side of respective interior walls 19 adjacent the front wall 10 of the intermediate housing portion. Each blower motor 23 is disposed coaxially within an oversize tubular member 24, one end of which is secured to the shaft end of the motor housing by means of a plurality of brackets 25 and suitable fastening screws. The opposite end of each tubular member seats against a gasket ring 26 carried by the front cabinet wall 10 and the latter is provided with a louvered opening 27 within the confines of respective gasket rings 26.

The means for supporting each tubular member 24 and thus its blower motor and associated blower in position presently comprises a plurality of wire legs 28 spaced radially about the member 24 and welded or otherwise secured thereto. Each leg has an apertured foot portion 29 adjacent respective angularly disposed interior walls 19 and suitable bolts secure such foot portions to respective said walls. Although not shown, conventional rubber insulating members or the like will be interposed between each foot portion 29 and its wall and between the foot portion and its attaching bolt to isolate motor-blower vibration from the cabinet.

Figure 4:
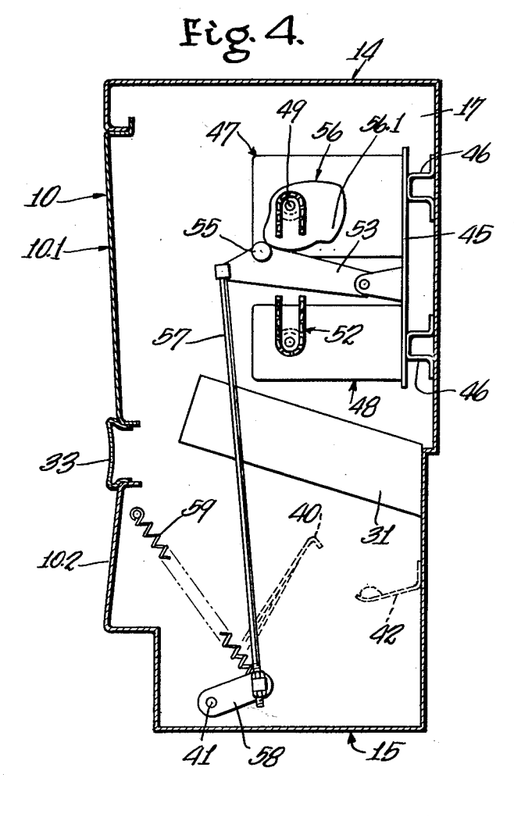
FIGURE 4 is a view similar to FIGURE 3 but with certain parts shown in another position.
Figure 5:
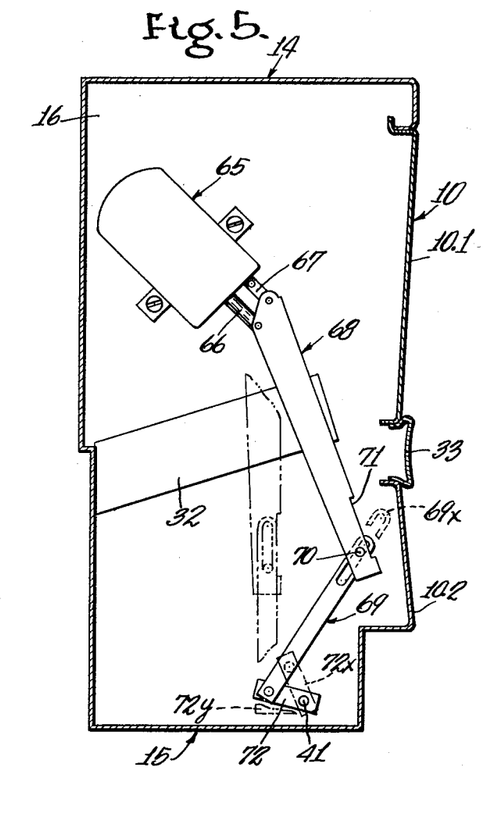
FIGURE 5 is an enlarged sectional view generally corresponding to the line 5—5 of FIGURE 1.

Turning now to the heater section of the intermediate cabinet portion, such section presently comprises a bank of electric resistance heating elements 30 extending longitudinally of the intermediate portion of the cabinet between the spaced, cabinet-dividing walls 16, 17, and disposed just below the above-described blowers and motors. While any suitable type of heating element may be employed (indeed, the invention is not limited to the use of electric heating elements) it is preferable to use elements of the tubular, metallic sheathed type having a resistor conductor within the sheath and embedded in electric-insulating, heat-conductive material. Each element sheath has an external spiral fin to facilitate heat transfer from the element. As herein disclosed, each element is rectilinear and has its ends projecting through and supported by respective cabinet dividing walls 16, 17. As seen in FIGURES 4 and 5 electrical connection boxes 31, 32 are carried by respective dividing walls 17, 16 and enclose respective element terminal ends. At the present time, nine individual electric heating elements, identified as 30.1 to 30.9 are arranged in a lower row of six elements and an upper row of three elements, each row being angularly disposed in the manner illustrated.

Still referring to FIGURE 2, the front cabinet wall 10 is divided into an upper portion 10.1 and a lower portion 10.2, such portions being vertically spaced as shown. Upper portion 10.1 is preferably made removable to provide ready access to both the upper blower section and the intermediate heater section of the cabinet. A trim strip 33 is removably secured between the portions 10.1, 10.2 by any suitable means to close the gap therebetween. As best seen in FIGURE 1, strip 33 is preferably formed of three pieces in end to end relation, the center piece 33.1 being removable independently of the end pieces for a purpose to appear.

Carried by each of the dividing walls 16, 17 (only wall 16 being seen in FIGURE 2) are respective channel members 34 (only one of which is visible in FIGURE 2). These channel members are secured to respective walls in parallel relation and inclined as shown, with their flanges extending toward each other to provide a track for slidably receiving a filter element 35. Carried by the cabinet back 11 is a strip of rubber or the like 36 for engaging the adjoining edge of the filter to prevent air leakage thereabout. A similar strip of rubber or the like 37 is carried by the intermediate trim strip portion 33.1 for a similar purpose. Obviously, filter element 35 may readily be removed for cleaning or replacement by removing trim strip portion 33.1 and by sliding the element out of the channel members 34.

Still referring to FIGURE 2 and with attention directed to the lower intake-damper section of the central cabinet portion, the rear wall 11 of the cabinet forming this section is provided with a longitudinally extending opening 38 which is adapted to be aligned with an opening to the outside in the wall against which the unit ventilator is adapted to be installed. Lower, front wall portion 10.2 is provided with a series of louvered openings 39 through which room air may enter the lower section of the central cabinet portion.

Disposed within the lower section of the central cabinet portion is an elongated damper 40 secured to a damper shaft 41 which extends through and is journaled in respective cabinet dividing walls 16, 17. In the full-line position shown, damper 40 has closed the interior of the cabinet against the entrance of outside air through the rear wall aperture 38, a lip on the damper seating against a rubber strip or the like carried by a bracket 42 on the rear cabinet wall and extending the full length of the damper. A suitable flexible sealing member 43 will prevent air leakage around the bottom of the damper and other suitable flexible sealing members (not shown) will prevent air leakage around respective ends of the damper. Note that damper 40 may be swung about its shaft axis to the phantom-line position 40X wherein it abuts a portion 10.3 of lower cabinet wall 10.2 which portions extends the full length of damper 40 so that substantially all the air entering the cabinet interior will be outside air coming through rear wall opening 38.

Since the rear face of damper 40 is exposed to outside air while its front face is exposed to room air, considerable heat loss from the room can take place by conduction through the damper even though the latter is tightly closed against the entrance of outside air. Accordingly, the rear face of the damper is presently covered by a suitable layer of insulating material 44 which minimizes such heat loss.

Figure 3:
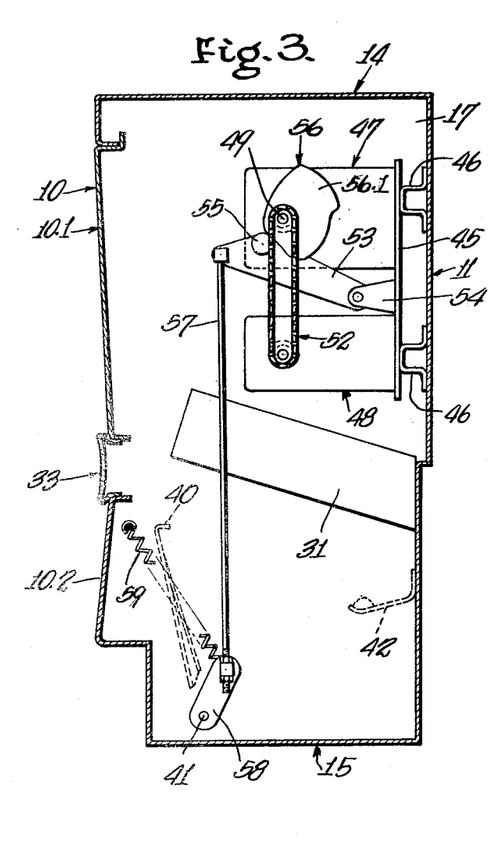
FIGURE 3 is an enlarged sectional view generally corresponding to the line 3—3 of FIGURE 1.

Referring now to FIGURE 3 wherein the right-hand end cabinet portion is shown, a mounting base 45 is secured to the rear cabinet wall 11 by means of suitable brackets 46. Secured to base 45 in vertically spaced relation is a motor unit 47 and a drum switching unit 48. Since these units are commercially available items obtainable from The Barber-Colman Company, and respectively identified as MU478 and SP100B–X2, the following brief description of their function will suffice.

Unit 47 comprises an electric motor suitably geared to an output shaft 49 to rotate the latter from a predetermined position to the position illustrated in a counterclockwise direction (in the position of parts viewed) through one hundred eighty degrees and to rotate said shaft in the opposite direction toward said predetermined shaft position. Included in the unit is a spring arrangement which rotates the output shaft 49 in a clockwise direction to the predetermined position aforesaid whenever the electric motor is de-energized.

As will later be covered in greater detail, motor unit 47 is adapted to be controlled by a room thermostat seen in FIGURE 6. This room thermostat may be mounted at any suitable place in the same room with the unit ventilator or, alternatively, it may be mounted within the unit ventilator casing and so arranged that room air will be continually drawn thereover. Motor unit 47 is not only controlled by the room thermostat, but is also controlled by a discharge air thermostat, seen in FIGURE 6, which is responsive to the temperature of the air discharged out of the unit casing into the room through the grill 22.

Unit 48 contains a number of switches, preferably one for each of the heating elements 30, and a rotatably mounted cam for opening and closing each switch in accordance with cam rotation. As seen schematically in FIGURE 6, switches 50.1 through 50.9 are interposed in a power circuit with heating elements 30.1 through 30.9 respectively and each switch is engaged with respective cams 51.1 through 51.9. As illustrated, such cams are mounted for simultaneous rotation about a common axis and are presently adapted to be rotated by the output shaft 49 of the motor unit 47 at a one-to-one ratio therewith by means of a sprocket and chain drive 52.

Still referring to FIGURE 3, a cam follower lever 53 is pivoted to the mounting plate 45 by means of a bracket 54 and carries a roller 55 for engagement with the periphery of a plate cam 56 mounted on the motor unit output shaft 49 for rotation therewith. Pivotally connected to the free end of lever 53 is one end of a link 57 whose other end is pivotally connected to the free end of an arm 58 structurally integral with the damper shaft 41. Also connected to the free end of arm 58 is a tension spring 59 which urges the arm in a counterclockwise direction (in the position of parts viewed in FIGURE 3) to thus maintain the roller 55 in engagement with the working periphery of the cam 56.

With the construction thus far disclosed and with the unit ventilator functioning on its day (or room occupied) cycle, it will first be assumed that room temperature is higher than that for which the room thermostat is set. The room thermostat, therefore, is calling for room cooling. Under such conditions, motor unit 47 has rotated in a counter-clockwise direction to its maximum position, seen in FIGURES 3 and 6. As seen in the last mentioned figure, cams 51.1 through 51.9 are at this time positioned to hold switches 50.1 through 50.9 open so that all of the heating elements 30.1 through 30.9 are de-energized.

With reference to FIGURE 3, and assuming, of course, that the blower units are functioning to draw air from the lower, air intake central cabinet portion and to discharge such air through the outlet grill 20, it will be noted that spring 59 has biased arm 58 in a counter-clockwise direction so that roller 55 of lever 53 is riding on the smallest diameter portion of cam 56. In this position of parts, damper 40 will have been rotated to the position shown (such position also being illustrated at 40X in FIGURE 2) wherein the maximum quantity of outside air is admitted through the cabinet opening 38 for discharge into the room, with no room air being admitted through the louvered cabinet openings 39 because the damper is positioned against the portion 10.3 of the lower cabinet wall.

The unit will continue to discharge outside air into the room so long as the room temperature exceeds the thermostat setting; however, in the event that the temperature of the discharge air falls below a given temperature (say, 60 degrees), the motor unit 47 will function to rotate the damper from the 40X position seen in FIGURE 2 toward the 40Y position to reduce the quantity of outside air drawn into the unit and to correspondingly increase the quantity of room air drawn thereinto. This prevents the discharge into the room of large quantities of very cold outside air that would tend to cause drafts.

Figure 7:
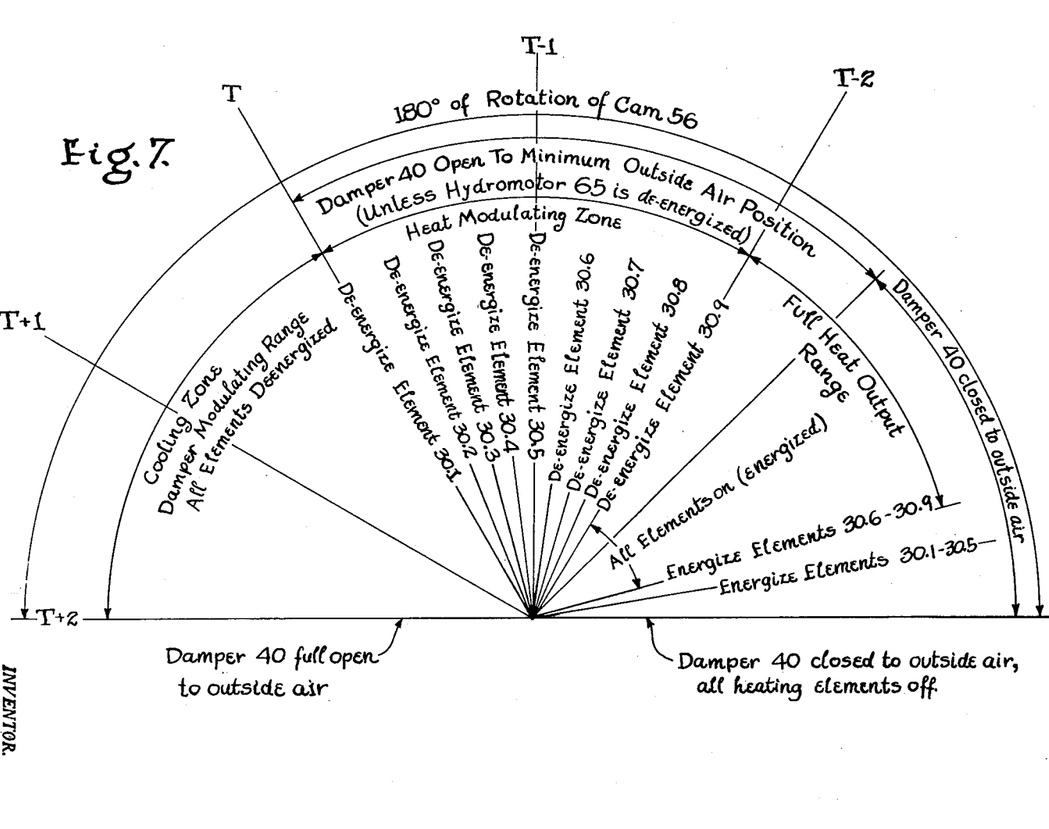
FIGURE 7 is a diagram showing an operating sequence of the present device.

When the room temperature falls to a given level, say just below two degrees above the temperature setting of the room thermostat (represented by $T+2$ in the FIGURE 7 diagram), the output shaft of motor unit 47 and consequently cam 56 will be caused to rotate in a clockwise direction from the position of parts seen in FIGURE 3. Such cam rotation will push lever 53 down and this will rotate the arm 58 and the damper 40 to reduce the amount of outside air drawn into the cabinet and to correspondingly increase the amount of room air drawn thereinto. It will be understood that the closer the room temperature approaches the setting of the room thermostat, the further cam 56 will be rotated in the specified direction and the less outside air and the more inside air will be admitted.

Since the switch cams 51.1 through 51.9 are connected to the output shaft 49 of the motor unit 47 by means of the sprocket and chain drive 52, movement of the output shaft as above-outlined will also effect clockwise movement of these switch cams; however, their profile is such that their respective switches are held open until shaft 49 has been rotated an amount later to be disclosed.

Assuming now that room temperature coincides with the room thermostat setting (T), motor unit 47 will have positioned cam 56 as seen in FIGURE 4. With the cam thus positioned, damper 40 will be disposed in a minimum outside air position as shown (see also position 40Y of FIGURE 2) wherein about one third of the air admitted to the cabinet is outside air. All heating elements 30.1 through 30.9 will remain de-energized since none of the cams 51.1 through 51.9 have rotated sufficiently to allow any of the contacts to close.

It should, perhaps, be pointed out that the law in many states require that a certain minimum amount of fresh, outside air be continually admitted to a classroom at all times that the latter is occupied. It is for this reason that the cam 56 positions the damper as illustrated in FIGURE 4 when room temperature coincides with the room thermostat setting. Obviously, cam 56 will be designed to close the damper against the entrance of any outside air under the temperature conditions above-stated (in order to obviate the necessity of heating cold, outside air) when a minimum fresh air requirement need not be met. Additionally, while the present embodiment is designed to admit a minimum of approximately one third fresh air, cam 56 could as well be formed to admit any other minimum amount.

With the parts positioned as seen in FIGURE 4, if room temperature falls slightly below the setting of the room thermostat, motor unit 47 will rotate cam 56 slightly in a clockwise direction from that shown. Such cam movement will have no effect upon the damper 40 since the cam profile at this point is concentric with the cam's rotational axis; however, rotation of the shaft 49 on which the cam is mounted will, through the chain and sprocket drive 52, cause rotation of the switch cams 51.1 through 51.9 sufficiently to cause switch 50.1 to fall off the lobe of cam 51.1 thus energizing heating element 30.1.

As the room temperature drops still further beneath the setting of the room thermostat, motor unit 47 will rotate its output shaft still further in a clockwise direction to progressively energize the heating elements until all elements are energizing when the room temperature is, for example, two degrees or more below the setting of the room thermostat ($T-2$). Rotation of cam 56 through this range of movement will have no effect upon the damper 40, the latter remaining in its minimum outside air position previously described because of the circular profile of the cam at this point.

It will be understood that as the room temperature begins to rise and approach the setting of the room thermostat, rotation of motor unit 47 in a counter-clockwise direction will cause element 30.9 to be de-energized when the temperature is two degrees below the setting of the room thermostat ($T-2$). Further increase in room temperature will cause further rotation of the motor unit in a counter-clockwise direction to thus progressively de-energize the heating elements until all are once again de-energized when the room temperature and the setting of the room thermostat coincide. If the room temperature continues to rise, continued rotation of the motor unit will cause cam 56 to open the damper to admit more outside air to the room for cooling as previously described.

Figure 6:
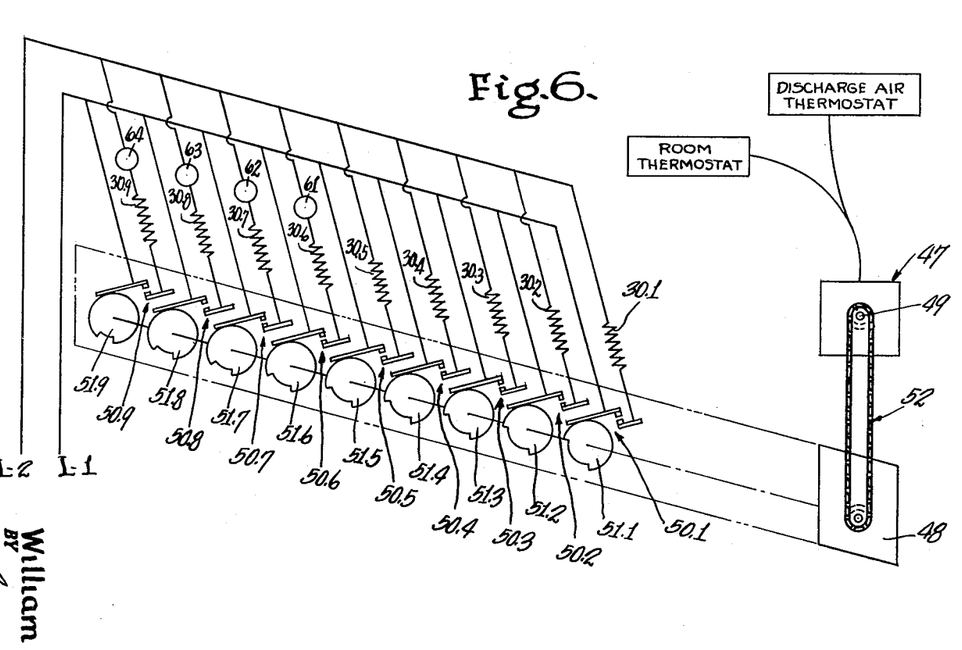
FIGURE 6 is a view similar to FIGURE 3 but showing certain electrical components.

With reference to FIGURE 6, thermostats 61, 62, 63 and 64 are connected in series with respective heating elements 30.6, 30.7, 30.8 and 30.9. These thermostats are responsive to outside air temperature and are adapted to open the power circuit to their associated elements upon a rise in the outside temperature. By way of illustration, thermostat 61 may open its contacts at outside temperatures above 50° F., at temperatures above 40° F., 63 at temperatures above 30° F., and 64 at temperatures above 20° F. This arrangement tailors heat output of the unit to the heat loss of the room to prevent too rapid heating thereof. It additionally limits electric current demand of the unit by cutting out excess heating capacity during relatively mild weather to thus reduce heating costs.

In the event of a power failure at any time the unit is functioning or when a suitable clock control device (not shown) signals that the room occupied period (day cycle) has terminated and that a room unoccupied period (night cycle) has commenced, motor unit 47 will be de-energized and its contained spring will cause rotation of its output shaft 49 in a clockwise direction until lobe 56.1 of cam 56 moves lever 53 down sufficiently to fully close the damper 40 (as seen in full lines in FIGURE 2) against the entrance of outside air. In this position of cam 56, cams 51.1 through 51.9 will be one hundred eighty degrees from the position seen in FIGURE 6 wherein their associated switch contacts will still be held open. The parts will remain in the position above-described until the power failure is repaired or until the clock control device (not shown) once again signals that the room occupied period is about to commence.

During the room unoccupied period (night cycle), it is preferable that the unit ventilators in all of the classrooms be controlled from a central source which may be a thermostat associated with the previously mentioned clock control device. This central thermostat will preferably energize and de-ennergize the heating elements of all of the unit ventilators simultaneously as necessary to keep a minimum overnight temperature which will usually be materially less than the comfortable day time temperature maintained by the individual room thermostats. During this night cycle, it is to be understood that the damper of all of the individual units remain closed at all times since the motor units of respective ventilator units remain de-energized.

Since the overnight temperature maintained by the central thermostat is materially below comfort level, the temperature in the individual classrooms must be raised prior to the time the students enter for the first class period. This can readily be accomplished by having the clock control device return the control of respective unit ventilators to respective room thermostats prior to room occupancy. However, with the construction thus far disclosed, the damper 40 would be opened to the minimum outside air position as soon as room temperature approaches the thermostat setting. This is undesirable since considerable energy would be wasted in heating up cold outside air which, at this time, would needlessly be introduced into the room.

Accordingly, provision is made for retaining the damper 40 tightly closed against the entrance of outside air even though room temperature is at the thermostat setting and even though the heat output of the unit is under the control of the room thermostat as earlier described, until such time as the students enter the room for their first class period. Thereafter, control of the damper will be turned over to the cam 56 which will maintain it open to at least its minimum outside air position, as previously disclosed, during the remainder of the normal day operating cycle.

The means for retaining the damper 40 closed during the room warm-up period comprises a damper override mechanism in the left hand end cabinet portion as seen in FIGURE 5. Such mechanism comprises a hydramotor 65, available from General Controls Company, and identified as DHOA222, which has an operating shaft 66 adapted to be drawn inwardly when the hydramotor is electrically de-energized. Pivotally attached to the hydramotor through a link 67 is the upper end of a channel shaped arm 68 having pivotal connection with the operating shaft 66. The lower end of arm 68 is connected to the upper end of a slotted link 69 by means of a pivot pin 70. The web of channel arm 68 is cut away adjacent pin 70 at 71 for a purpose to appear. The lower end of link 69 is pivoted to the free end of an arm 72 which is attached to and rotatable with the damper shaft 41.

As seen in FIGURE 5, hydramotor 65 is energized so that its shaft 66 is extended to thus dispose channel arm 68 in the full line position where it will have no effect upon damper action. Damper 40 is at this time disposed in its minimum outside air position to thus dispose the arm 72 and the link 69 in their full line positions. In the event the damper is shifted to its maximum outside air position (as seen at 40X in FIGURE 2) by the cam 56 as previously described, arm 72 will be disposed in the phantom line position shown at 72X. During such movement of arm 72, link 69 will be carried upwardly as indicated at 69X, the pivot pin 70 merely sliding along the slot in link 69. Movement of arm 72 in the opposite direction to the position indicated at 72Y, as when damper 40 is shifted by the cam 56 to its closed outside air position (as seen in full lines in FIGURE 2), will shift link 69 downwardly, the pivot pin 72 sliding in the same manner along the slot in link 69.

Returning now to the condition previously described wherein morning warm up is about to begin, it will be recalled that the lobe 56.1 of cam 56 is holding the damper 40 in its closed to outside air position and that the cams 51.1 through 51.9 of FIGURE 6 are one hundred eighty degrees from the position illustrated (each cam, however, still holding its switch contacts open). As the previously mentioned clock control device (not shown) returns control of the unit ventilator from the central thermostat (not shown) to the individual room thermostats, the hydramotor 65 of each unit ventilator will remain de-energized so that its shaft 66 remains drawn inwardly. Thus, the channel arm 68 and the link 69 will remain in their phantom line positions wherein the damper will be locked in its closed to outside air position.

As the morning warm up cycle begins, room temperature will be materially below a normal comfort level since the central thermostat has held temperatures down overnight in the interest of economy. Accordingly, as soon as the clock device turns control of the unit over to the room thermostat, the latter calls for heat by rotating the output shaft of the motor unit 47 in a counterclockwise direction from its off position. Rotation of cam 56 as above mentioned would normally open the damper 40 to its minimum outside air position when the rising room temperature approaches within two degrees of the room thermostat setting (T−2); however, it will be recalled that the still de-energized hydramotor 65 has locked the damper against movement and thus it remains closed to outside air.

Although rotation of cam 56 from its above-mentioned off position at this time performs no work, the rotation of the output shaft 49 on which it is mounted effects rotation of cams 51.1 through 51.9 of the switching unit 48 through the sprocket and chain drive 52. Upon initial rotation of cams 51.1 through 51.9 approximately ten degrees (see also FIGURE 7) switches 50.1 through 50.5 will fall off the lobes of respective cams to energize heating elements 30.1 through 30.5. After approximately another five degrees rotation of the cams of the switching unit, contacts 50.6 through 50.9 will fall off the lobes of their cams to energize heating elements 30.6 through 30.9 (assuming, of course, that the outside temperature is sufficiently low to cause thermostats 61 through 64 to be closed). At this point, all of the heating elements will be energized unless the outside temperature is mild as previously mentioned.

As the room temperature rises, the room thermostat will cause still further counter-clockwise rotation of the output shaft 49 of the motor unit 47 and consequent rotation of the cams of the switch unit 48 since the position of the motor unit shaft is at all times proportional to the differential between room temperature and room thermostat setting. When room temperature reaches a predetermined level, say two degrees beneath the room thermostat setting (T−2), switch 50.9 will ride up on the lobe of its cam 51.9 to de-energize heating element 30.9. As the room temperature continues to rise the cams of the switch unit will continue to be rotated, such cams progressively switching off the heating elements 30.8, 30.7, 30.6, etc., until all elements are de-energized when the room temperature coincides with the thermostat setting (I). If heat is again required, as when room temperature once again falls below the thermostat setting, motor unit output shaft will be rotated in a clockwise direction an amount proportional to the temperature differential to once again progressively energize one or more of the heating elements.

When the time arrives for room occupancy to begin, the previously mentioned clock control device will energize hydramotor 65 to thus shift its channel arm 68 from its phantom line position to its full line position. This will permit the damper spring 59 to pull the damper 40 open, at least to its minimum outside air position, until the roller 55 of the follower lever 53 engages the periphery of the cam 56. From this time, during the remainder of the room occupied period (day cycle), the damper 40 will be under the control of the motor unit 47, the latter normally shifting the damper from its minimum outside air position to its maximum outside air position, as previously described, in accordance with room temperature.

It is to be understood that the heat output of the elements 30.1 through 30.9 is such that a room temperature of at least two degrees less than thermostat setting can easily be maintained under all normal operating conditions. However, it is possible for a condition to arise wherein the heat output of the unit is unable to maintain a room temperature of just under two degrees below thermostat setting. This could occur, for example, if one or more windows were opened to the outside during very cold weather.

Assuming the unit to be functioning on its room occupied cycle wherein at least minimum outside air is being admitted and further assuming that a window is opened to lower the room temperature to two degrees below the room theromstat setting, motor unit 47 will rotate cams 51.1 through 51.9 sufficiently to energize all of the heating elements 30.1 through 30.9. If the heat output of all of the heating elements is insufficient to prevent a further fall in room temperature and the latter then falls to just under two degrees below the thermostat setting, motor 47 will rotate cam 56 in a clockwise direction sufficiently that its lobe 56.1 will close the damper against the entrance of outside air through the housing opening 38. Damper 40 will remain closed to outside air and all of the heating elements will remain energized until room temperature once again rises to just under two degrees below the room thermostat setting.

Upon a rise in room temperature to just under two degrees below the room thermostat setting, motor 47 will rotate cam 56 in a counter-clockwise direction so that the cam follower roller 55 falls off the lobe 56.1 of the cam to thus open the damper 40 to its minimum outside air position. A further rise in room temperature will begin to progressively de-energize the heating elements as before described when room temperature is two degrees below the room thermostat setting.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. An air conditioning device, comprising a housing through which air is drawn for discharge into a room to be conditioned, said housing having a central portion flanked by end portions, a first air inlet in said housing central portion for admitting air from the room, a second air inlet also in said housing central portion and spaced from said first air inlet for admitting air from the outside of said room, a temperature responsive device affected by room temperature and adjustable to respond to a selected desired room temperature, motor means within one of said housing end portions and shiftable to various positions in accordance with room temperature and whose position is proportional to the differential between actual room temperature and said desired room temperature, damper means within said housing central portion to control air flow through said air inlets, said damper means being connected to said motor means and shiftable thereby from a first position wherein said first air inlet is at least partially closed and said second air inlet is open, to a second position wherein said second air inlet is at least partially closed and said first air inlet is open, heating means within said housing central portion for heating air before discharge thereof into said room, means for controlling operation of said heating means, said control means being connected to said motor means for actuation thereby in accordance with room temperature, and override means within said housing other end portion and connected to said damper means for selectively maintaining the latter in position closing said second air inlet regardless of the position of said motor means.

2. A room air conditioning device, comprising a housing having an air outlet into the room and two air inlets, one of the latter being a room air inlet for admitting air from the room and the other being an outside-the-room air inlet for admitting air from outside the room, damper means within said housing for controlling air through each of said air inlets, said damper means being movable to a first position wherein said room air inlet is at least partially closed and said outside-the-room air inlet is open, and said damper means being movable to a second position wherein said outside-the-room air inlet is at least partially closed and said room air inlet is open, a plurality of electric heating elements within said housing for heating air before discharge through said air outlet, a temperature responsive device affected by the temperature in said room and adjustable to respond to a selected desired room temperature, switch means comprising a plurality of sequentially operated switches electrically connected between individual heating elements and a source of electrical energy, a single electric motor having an operator shaft rotatable to various positions in accordance with and proportional to the differential between actual room temperature and said desired temperature, motion translating means between said operator shaft and said damper means to move the latter only during certain rotational movement of the former, a connection between said operator shaft and said switch means so that movement of the former effects movement of the latter, said sequentially operated switches being engaged to establish electrical energy to said heating elements during only a predetermined portion of the movement of the operator shaft, said operator shaft being rotatable in a predetermined direction and a predetermined amount when actual room temperature is below desired temperature to move said damper means through said translating means to said second position without effecting closure of said sequentially operated switches, and said operator shaft being further rotatable in the same direction when the actual room temperature is below said desired room temperature to sequentially close said switches, said translating means providing for this additional movement of said operator shaft without affecting movement of said damper means.

3. The construction of claim 2 wherein a thermally responsive means is operatively associated with at least one of said electric heating elements, said thermally responsive means being affected by temperature outside of said room.

4. A room air conditioning device, comprising a housing having an air outlet into the room and two air inlets, one of the latter being a room air inlet for admitting air from the room and the other being an outside-the-room air inlet for admitting air from outside of the room, damper means within said housing for controlling flow of air through each of said air inlets, said damper means being movable to a first position wherein said room air inlet is at least partially closed and said outside-the-room air inlet is open, and said damper means being movable to a second position wherein said outside-the-room air inlet is at least partially closed and said room air inlet is open, heating means within said housing for heating air flowing to and through said air outlet, a temperature responsive device affected by the temperature in said room and adjustable to respond to a selected desired room temperature, a single motor having an operator shiftable to various positions in accordance with and proportional to the differential between actual room temperature and said desired room temperature, heater control means connected to said heating means for controlling the heat output of the latter, said heater control means being connected to said motor operator and operated by movement of the latter, a cam operatively associated with said motor operator for movement thereby, a cam follower operatively associated with said cam and connected to said damper means for movement thereof between said positions, and resilient means biasing said damper means toward said first position and said cam follower toward engagement with said cam.

5. The construction of claim 4 wherein said damper means is a single member movable between said two air inlets.

6. A room air conditioning device, comprising a housing having an air outlet into the room and two air inlets, one of the latter being a room air inlet for admitting air from the room and the other being an outside-the-room air inlet for admitting air from outside the room, damper means within said housing for controlling flow of air through each of said air inlets, said damper means being movable to a first position wherein said room air inlet is at least partially closed and said outside-the-room air inlet is open, and said damper means being movable to a second position wherein said outside-the-room air inlet is at least partially closed and said room air inlet is open, heating means within said housing for heating air flowing to and through said air outlet, a temperature responsive device affected by the temperature in said room and adjustable to respond to a selected desired room temperature, a single motor having an operator shiftable to various positions in accordance with and proportional to the differential between actual room temperature and said desired room temperature, heater control means for controlling the heat output of said heating means, said heater control means being connected to said motor operator and operated by the shifting movement of the same, link means connecting said motor operator to said damper means for shifting the latter between said positions, and over-ride means connected to said damper means for selectively maintaining the latter in position closing said outside-the-room air inlet regardless of the position of said motor operator.

7. The construction of claim 6 wherein said link means includes a cam shiftable with said motor operator and a cam follower engageable with said cam, and wherein resilient means biases said damper means to said first position and said cam follower to engagement with said cam, and wherein said over-ride means selectively maintains said damper means in position closing said outside-the-room air inlet against the force exerted by said resilient means.

8. A room air conditioning device, comprising a housing having an air outlet into the room and two air inlets, one of the latter being a room air inlet for admitting air from the room and the other being an outside-the-room air inlet for admitting air from outside the room, damper means within said housing for controlling flow of air through each of said air inlets, said damper means being movable to a first position wherein said room air inlet is at least partially closed and said outside-the-room air inlet is open, and said damper means being movable to a second position wherein said outside-the-room air inlet is at least partially closed and said room air inlet is open, a plurality of electric heating elements within said housing for heating air before discharge through said air outlet, a temperature responsive device affected by the temperature in said room and adjustable to respond to a selected desired room temperature, switch means comprising a plurality of sequentially operated switches electrically connected between individual heating elements and a source of electrical energy, a single electric motor having an operator shaft rotatable to various positions in accordance with and proportional to the differential between actual room temperature and said desired room temperature, means connecting said operator shaft with said damper means for shifting the latter between its positions, means connecting said operator shaft with said switch means to sequentially energize or deenergize said heating elements to meet heating requirements as called for by the adjustment of said temperature responsive means, and means associated with said motor for rotating said operator shaft to a position wherein said damper means closes said outside-the-room air inlet and wherein said switch means is positioned to de-energize all of said heating elements when electrical power to said device is cut off.

9. The construction of claim 8 wherein said last named means comprises a spring which urges said motor shaft to the position specified.

References Cited in the file of this patent
UNITED STATES PATENTS

| | | |
|---|---|---|
| 1,668,537 | Lurken | May 1, 1928 |
| 1,753,157 | Otis | Apr. 1, 1930 |
| 1,845,243 | Cox | Feb. 16, 1932 |
| 1,939,916 | Otto | Dec. 19, 1933 |
| 2,054,071 | Cummings | Sept. 15, 1936 |
| 2,154,511 | Kingsland | Apr. 18, 1939 |
| 2,154,523 | Midyette | Apr. 18, 1939 |
| 2,209,800 | Terry | July 30, 1940 |
| 2,327,663 | Otis | Aug. 24, 1943 |
| 2,441,726 | Smith | May 18, 1948 |
| 2,449,755 | Taylor | Sept. 21, 1948 |
| 2,549,952 | Wheelock | Apr. 24, 1951 |
| 2,727,691 | Alyea et al. | Dec. 20, 1955 |
| 2,828,110 | Baker et al. | Mar. 25, 1958 |
| 2,843,324 | Baker | July 15, 1958 |
| 2,904,317 | Copeland et al. | Sept. 15, 1959 |
| 2,935,261 | Smith | May 3, 1960 |

FOREIGN PATENTS

| | | |
|---|---|---|
| 426,580 | Italy | Oct. 29, 1947 |
| 939,897 | Germany | Mar. 8, 1956 |